United States Patent [19]

Donovan

[11] 4,403,220
[45] Sep. 6, 1983

[54] RADAR SYSTEM FOR COLLISION AVOIDANCE

[76] Inventor: John S. Donovan, 16503 Santa Rosa, Detroit, Mich. 48221

[21] Appl. No.: 142,288

[22] Filed: Apr. 17, 1980

Related U.S. Application Data

[63] Continuation-in-part of Ser. No. 118,704, Feb. 5, 1980, abandoned, which is a continuation-in-part of Ser. No. 84,011, Oct. 11, 1979, abandoned.

[51] Int. Cl.³ ............................................. G01S 13/60
[52] U.S. Cl. ........................................ 343/6 R; 343/8
[58] Field of Search ..................... 343/8, 112 CA, 6 R

[56] References Cited

U.S. PATENT DOCUMENTS

2,859,433  11/1958  Saxton et al. ............................ 343/8

Primary Examiner—T. H. Tubbesing
Attorney, Agent, or Firm—John R. Benefiel

[57] ABSTRACT

A radar system is disclosed adapted to detect relative headings between a system-equipped craft such as aircraft and ships at sea and a detected object moving relative to the ground, the system being particularly adapted to collision avoidance application. The system includes forward and rearward radar transmitter antennas, which are carried by each equipped vehicle. Each of the radar antennas is oscillated in synchronism with the other through a 180° sweep, the forward radar set transmitting a scan spectrum of directional pulses of rf radiation at incremental headings through the sweep. A narrow band pass receiver detects return or echo signals in a very narrow frequency band corresponding to doppler shifted transmission frequencies. The rear radar transmits at a constant frequency and the return signal is utilized to generate a differential frequency which is the end result of a given ground speed and antenna heading. The spectrum scan of the forward transmitter is shifted in accordance with the differential frequency in order to avoid transmitting at ground echo frequency, as well as to narrow the scanning spectrum frequency to provide a highly efficient time and energy utilization in the radar scan.

6 Claims, 5 Drawing Figures

| 80° 70° 60° 50° 40° 30° 20° 10° | 0° | 10° 20° 30° 40° 50° 60° 70° 80° |
|---|---|---|
| LEFT FORWARD | DEAD AHEAD | RIGHT FORWARD | ns
RADAR SYSTEM FOR COLLISION AVOIDANCE

CROSS REFERENCE TO RELATED APPLICATIONS

This application is a continuation-in-part of Ser. No. 118,704, filed Feb. 5, 1980, now abandoned, which is a continuation-in-part of Ser. No. 84,011, filed Oct. 11, 1979, now abandoned.

BACKGROUND DISCUSSION

This invention concerns radar systems and more particularly radar systems adapted to be utilized for anti-collision detection of aircraft, ships at sea and the like.

The constantly increasing density of air traffic in this country and throughout the world threatens to overburden the present system for managing air traffic around high traffic density areas, i.e., large metropolitan area airports. These present-day systems basically consist of an ordering of traffic by air traffic controllers utilizing ground-based radar and radio communication within the range of authority of a particular air control center.

Dangerous conditions potentially may arise from the increased possibility of air traffic controller error and/or errors by the aircraft pilots. In addition, the possibility of collision although somewhat reduced still exists in the air space outside traffic controlled air space.

Under conditions of reduced visibility, dangerous situations arising from such human error or other causes may not be easily avoided due to the relatively high speed at which aircraft are operated, sometimes requiring immediate evasive action to be taken.

Accordingly, anti-collision systems in addition to traffic control have been proposed and devised in the past. Generally, such systems have relied on ground-based radar which monitors the position of aircraft within a given air space and, with the aid of high speed computers, the positional and course data is processed to detect possibly dangerous situations arising from collision courses between detected aircraft.

Such systems of necessity involve enormously complex data processing which taxes even the capabilities of modern day high speed digital computers; furthermore, such systems provide no assistance in areas which are not monitored by the ground-based radar.

Simple anti-collision systems have also been devised in the past in which by the detection of proximity between crafts as by radio transponders, an alarm is set off to alert the pilots.

However, such alarm systems as heretofore devised have not been able to distinguish reliably the truly dangerous situations in crowded areas such as around metropolitan airports. Many false alarms are indicated tending to reduce pilot reliance on the system.

Similar situations sometimes arise in other environments such as with vessels on relatively high density sea lanes in darkness or heavy weather and in remote areas precluding the use of ground-based radar. The radar systems which are available only detect the proximity of a potential hazard rather than the existence of a dangerous collision course between two relatively moving ships.

High frequency (ten gigahertz) radar systems have heretofore been provided which will detect relative velocities or rates of closure between the craft carrying the radar system and other detected craft. Such systems have relied on the "doppler shift" effect on the radar transmission when it returns to the receiver, in order to detect relative rates of velocity between the craft carrying the transmitting radar equipment and the detected object while moving relative to the ground. In such systems, the frequency shift is detected by a narrow band pass radar set receiver. The relative velocities involved for which the system is designed to detect is such that doppler frequency shift is very slight.

The airborne radar set transmits a narrow beam which is sequenced through a spectrum of frequencies which are related to the frequency to which the receiver is tuned such that the entire range of possible relative rates of motion which may be encountered for all speeds of the carrying aircraft will result in a return echo of a frequency falling within the tuning of the receiver. That is, the doppler shifting effect on the transmitting frequency for each frequency increment in the scanned spectrum corresponds to an increment of the possible relative rate of motion between the aircraft and the object moving relative to the ground. If the object is receding, the doppler shift produces a reduction in frequency and if the object is approaching the aircraft, the frequency will be increased, shifting the return signal into the receiver frequency.

An inherent problem with this system involves the confusion of a ground echo with an echo received from a detected moving object. That is, when a return echo is received from the ground, this may tend to obscure the signals returned from the detected object.

The ground echo frequency of course shifts with the direction of the radar transmission with respect to the direction of movement of the aircraft and also varies with the relative ground speed of the aircraft.

The approach heretofore has been generally to merely blank out the ground echo with a signal processing system.

A further design defect in these systems is that the entire range of relative motion which could possibly be encountered by aircraft are scanned regardless of the ground speed of the airborne radar system. This results in the necessity to scan the widest range of possible relative rates of motion even though such rates of motion may be impossible at the ground speed at which the craft is actually moving.

That is, the highest possible rates of relative motion are generally the possible rate of speed of the carrying aircraft added to the possible ground speed of other aircraft which may be encountered. Thus, at relatively low ground speeds of the carrying aircraft, possible rates of motion are much less than that at relatively high speeds. Despite this, current designs scan the entire range of possible rates of relative motion. This requires a longer scan time and greater expenditure of energy than is inherently necessary in order to scan for all possible moving objects.

Accordingly, it is an object of the present invention to provide a radar system particularly suited for anti-collision in which the radar system is carried by the equipped craft and detects movement relative the ground and rates of motion with respect to the carrying aircraft.

It is a further object of the present invention to provide such a radar system in which the transmission of a ground echo producing signal is avoided automatically even though such ground echo transmission frequency varies with ground speed of the carrying vehicle and heading of the radar antenna.

It is still a further object of the present invention to provide such a radar system in which the transmitted sequenced frequencies of the spectrum are related to the ground speed of the carrying craft such as to maximize the efficiency of the scanning for possible detection of objects moving relative to the ground.

SUMMARY OF THE INVENTION

These and other objects of the present invention, which will become apparent upon a reading of the following specification and claims, are achieved by a radar system which is borne by a carrying craft. The rates of motion of the craft with respect to an object are detected by a forward radar set including a gyro-stabilized antenna which is oscillated through a 180° sweep centered on the direction of motion. A forward radar transmitter causes a rapid transmission of narrow beam of radio frequency radiation through a sequenced spectrum of frequencies at each of the incremental headings of the antenna through the sweep. The spectrum of frequencies is through a higher band in one direction of sweep than the other, with an intervening narrow band of frequencies at which no transmissions are made.

The frequencies are such as to generate return or "echo" signals of a frequency which is attenuated with a very narrow band pass receiver, with the spectrum of frequencies transmitted producing return signals of such frequency which are shifted by the doppler effect through a corresponding range selected to detect the moving objects within a predetermined proximity of the radar-carrying craft.

The upper spectrum of frequencies produces return echo signals from moving objects which have "passive" attitudes with respect to the radar-carrying craft. That is, they are not moving toward the radar-carrying craft or are relatively moving toward the radar-carrying craft due to an overtaking of the objects by the radar-carrying craft due to its higher velocity in the direction of the antenna heading.

The lower spectrum of frequencies produces return echo signals from objects which have an "aggressive" attitude with respect to the radar-carrying craft. That is, which are moving toward the radar-carrying craft due to their heading with respect to the craft.

The radar-carrying craft is also equipped with a rear radar set including a rear antenna which is oscillated through a 180° sweep centered on the direction of motion of the vehicle in synchronism with the antenna of the front radar set.

The rear radar set transmits at a constant frequency, and the return ground clutter echos and transmitted signals are mixed to generate a control signal whiich thus corresponds exactly to the differential of the doppler shift effect produced as a result of the ground speed of the carrying craft for a given antenna heading.

The control signal is utilized to shift the spectrum of frequencies of the forward radar transmissions such as to cause the upper and lower scanning spectrum to be symmetrical on either side of the frequency of transmission at which a ground echo signal would be received at a frequency within the attenuating range of the narrow band pass receiver of the forward radar set.

This arrangement avoids transmission at a frequency which would produce a return ground echo attenuated by the front receiver for all headings of the front antenna.

In addition, this enables the scanning of frequencies to be of a relatively narrow spectrum while accounting for all of the potential rates of relative motion of the detected object at any given ground speed of the radar-carrying craft.

This latter advantage produces a relatively efficient and rapid scan while insuring that objects moving at all possible rates of relative motion will be detected.

The return signals may be processed in an anti-collision calculator arrangement in which several antenna positions and distance of relative motion readings are processed, and the probability of collision indication computed such as to enable an alarm to be given in the event that a dangerous probability of collision arises.

That is, a repeat of several return signals at the same antenna headings in successive sweeps indicates a convergency of courses and combined with the proximity of the detected object, a dangerous possibility of collision can be determined.

The rearward received information may also be employed to calculate various other navigational information such as cross wind and ground speed, and itself may be employed to detect dangerous collision situations arising to the rear of the radar-carrying craft. The conventional radar crt display may also provide a visual indication of the readings of the forward and rearward radar sets.

DESCRIPTION OF THE DRAWINGS

FIG. 4 is a diagrammatic representation of two crafts on a collision course, with respect to each other.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

As summarized above, the concept according to the present invention envisions a vehicle borne radar system which operates on a doppler principle in order to detect the direction, distance, and relative velocity of ground objects possessing motion relative to the craft. The doppler radar system comprises a radar transmitter which transmits a sequenced spectrum of relatively high frequencies on the order of ten gigahertz per second which will result in a return echo, of the specific frequency in the range of the spectrum of transmitted frequencies corresponding to the rate of relative motion between the craft and the detected object. This specific frequency is detected by very narrow band pass receivers.

Thus, the transmitted frequency which results in a return echo attenuated by the narrow band pass receiver determines the relative rate of motion of the detected object with the time of return of the pulse or pulses providing an indication of the distance of the detected objects in conventional fashion.

According to the concept of the present invention, the scanning spectrum is of a minimum width while also avoiding the interference of ground echos by the incorporation of a second radar set in the system, preferably a rearward set, the primary set being the forward radar. Each of the respective radar sets is provided with a gyro-stabilized antenna which is oscillated through 180° sweeps in synchronism with each other.

The rear radar set transmits at a constant frequency and is provided with a receiver which detects the ground wave or echo signal in order to determine the doppler shift occurring as a result of the velocity of the radar-carrying craft and the particular antenna heading.

From this data, a control signal is generated continuously which is applied to the controls of the forward radar transmitter unit to cause a shift in the spectrum transmitted by the forward radar transmitter. The forward radar transmitter transmits a high and low frequency spectrum, one in a first direction of sweep of the antenna and the second in a return sweep of the antenna, separated by a narrow zone of frequencies at which the ground echo signal would be returned by a transmission of the forward radar transmitter at that particular ground speed and antenna heading.

For the first or high frequency scanning spectrum, the doppler shift will cause the transmitted frequency to be returned at the receiver attenuation frequency for detected objects traveling at or less than the ground speed of the radar-carrying craft. Such detected moving objects are relatively "passive" with respect to the radar-carrying craft. That is, they are either being overtaken by the greater velocity of the radar-carrying craft along the heading between the craft and the object, or are receding away due to the greater velocity or heading of the detected objects.

The second or lower frequency spectrum scan transmits through a range of frequencies which will result in a doppler shift of the transmitted pulses into the receiver frequency upon encountering a detected object moving relatively toward the craft due to a heading inclined toward the radar-carrying craft and thus having an "aggressive" attitude with respect thereto.

The appropriate range of frequencies in the respective scanning spectrums is produced by a shift in the scanning spectrum in accordance with the differential frequency generated by the rear radar set and doppler shift detecting circuitry such that the frequency spectrum varies with the ground speed and antenna heading. The separating narrow band of frequencies also varies with the doppler shift detection of the rear radar set such that the transmission frequencies of the high and low frequency spectrums do not fall within the frequencies at which a ground echo will be received by the forward narrow bandpass receiver.

Figure 1:
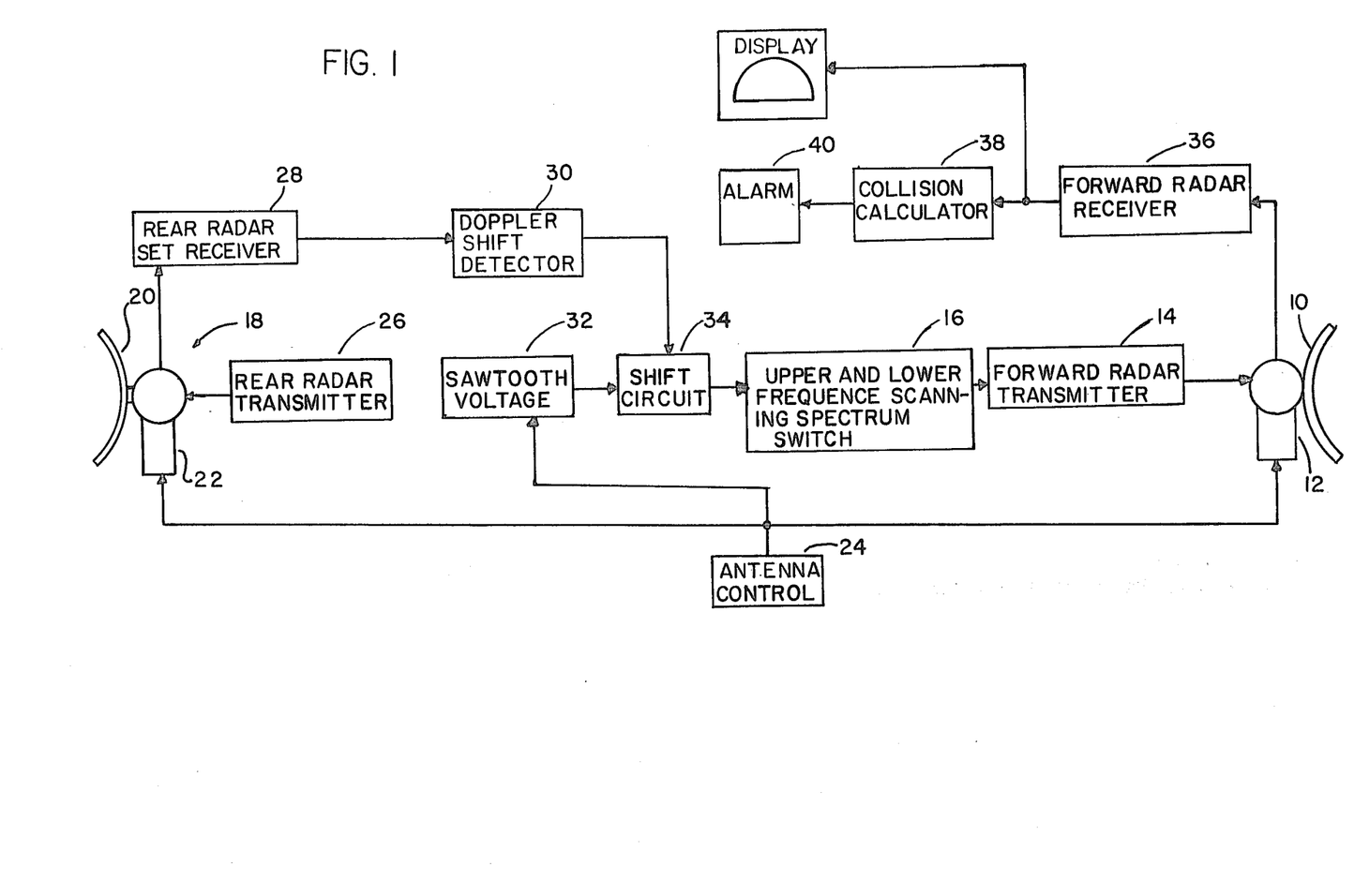
FIG. 1 is a block diagrammatic representation of the basic radar system according to the present invention.

This arrangement is depicted in FIG. 1 in block diagrammatic form.

The forward radar set includes a forward antenna 10 which is gyro-stabilized for pitch and roll and is generally driven by a drive arrangement indicated at 12 and swept through a 180° symmetrical oscillation centered on the forward direction of the craft under the control of the antenna control 24.

The forward radar also includes a transmitter 14 which causes the antenna 10 to emanate a narrow width beam of rf radiation through a scanned spectrum of transmission frequencies, which transmissions are in the form of a pulse train of sequentially changing frequency through the scanned spectrums on either side of the ground clutter frequency. An upper and lower frequency scanning spectrum switch 16 is provided for this purpose, which scanning function can be provided by a sawtooth voltage generator 32 to control the transmission of frequency dependent on the voltage of the inclining or declining side of the sawtooth waveform, in known fashion.

Such frequency spectrum scans are transmitted at incremental headings of the antenna 10 throughout its sweep, with a predetermined number of scans per sweep to give reasonably complete coverage of the monitored zone. The frequency spectrums are also in two differing bands as developed above depending on the direction of the sweep of the antenna 10 and accordingly will normally be controlled by set and reset end switches (not shown) associated with the forward antenna swing. The particular nature of the frequency spectrum will be described in detail hereinafter.

The radar system also includes the rear radar set indicated at 18 including an antenna 20 oscillated by an antenna drive arrangement 22 under the control of an antenna control 24 to produce a 180° sweep of the antenna which is maintained in synchronism with the sweep of the antenna 10 as by the use of three-phase AC antenna drive motors.

The rear radar set 18 includes a radar transmitter 26 which causes an rf transmission from the antenna 20 at a constant frequency, with the rear receiver 28 receiving the ground echos from the transmitted rf radiation.

The shift in frequency from the transmission frequency resulting from any doppler shift effect is detected by a doppler shift detector indicated at 30. Such functions of the rear receiver 28 and doppler shift detector 30 may be combined in a single unit such as by utilizing a conventional type receiver which directly generates a signal corresponding to the difference between the received signal and the transmitted signal. Such doppler shift circuit generates a differential signal, which may be utilized as a control signal.

The differential control signal is used to alter the voltage applied to the forward transmitter 14. A sawtooth voltage generator 32 by means of a shift circuit 34 is used such as to shift the scanning frequency of the passive and aggressive scanning spectrums in correspondence thereto.

The front radar set includes a narrow band pass receiver 36 which receives the return signals from transmitted pulses which have been reflected from the moving objects within the range of the forward radar set.

The return signals give an indication of the range and direction of the moving object with respect to the radar-carrying craft as may be displayed on a conventional radar display 42.

After a series of such return signals are processed in collision calculator 38, any progressive deviation of the antenna position at the time of the echo return of the detected object by the radar-carrying craft can be calculated or the possibility of a collision also calculated such as to set off an alarm 40 when such possibility becomes a dangerous probability.

Referring to FIG. 4, the relationship between the radar-carrying craft 33 and object 35 which are on a collision course can be appreciated in connection with the antenna heading at the time the object is detected over several antenna sweeps. In position "A", the object is first detected by antenna heading and over successive sweeps "B" and "C", for example, the antenna heading remains the same. Thus, the relative positions, the respective ground speeds of the craft and object, and their respective headings are all such as to produce the convergency which indicates a collision at point "X", unless these parameters change in the interim.

It can be appreciated that the detection of this condition is far simpler than with a ground based radar system, since only a simple memory function is required in cooperation with a proximity detection, i.e., range, it is simple to determine when such collision possibility becomes dangerous.

Figure 2:
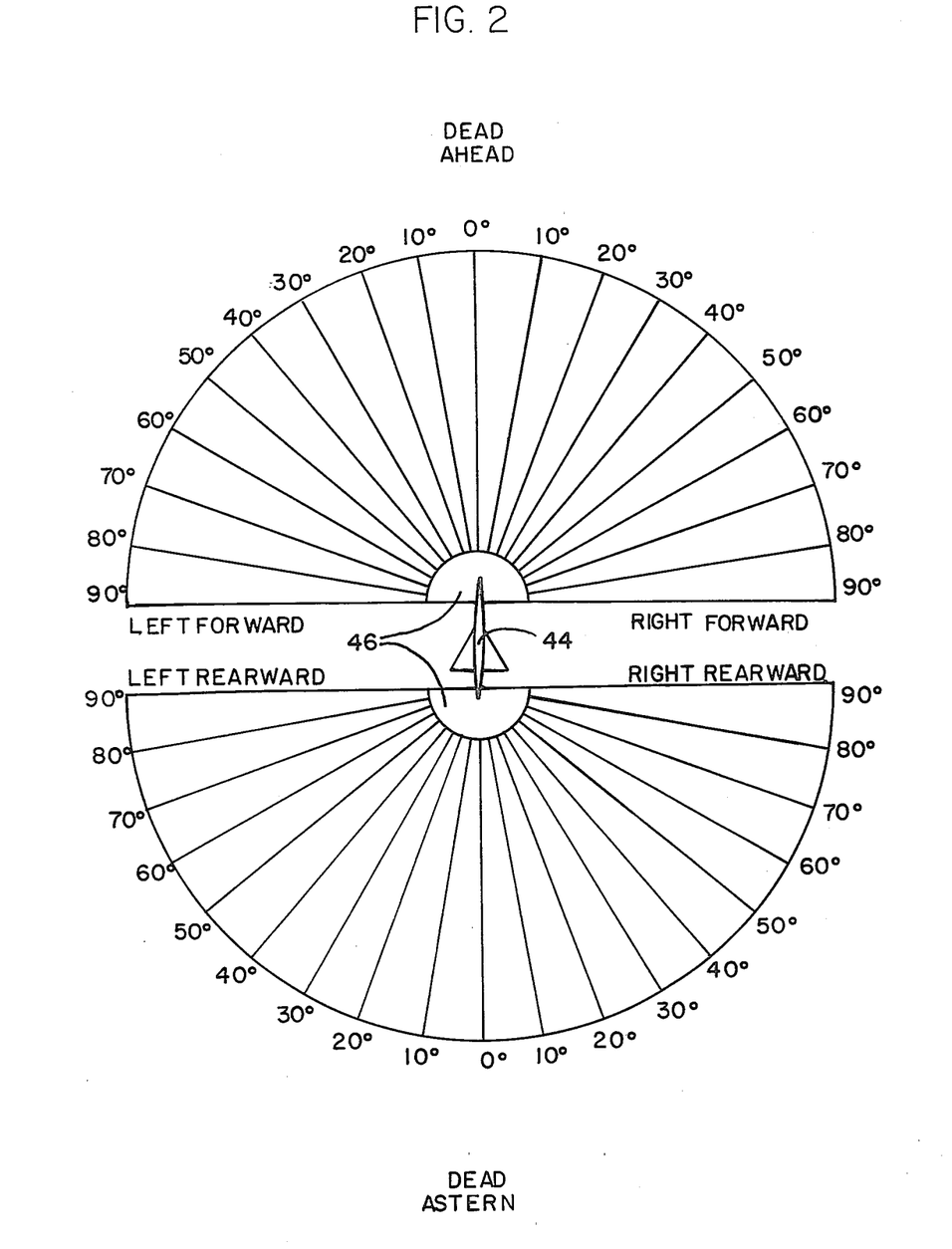
FIG. 2 is a diagrammatic representation of the radar-carrying craft and the relationship of the front and rear radar sets respective antennas.
Figure 3A:
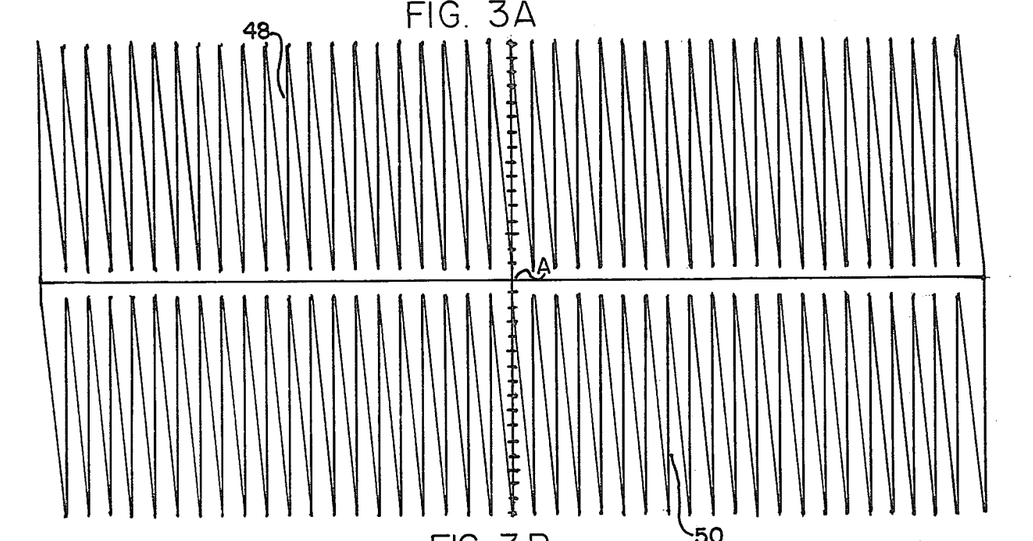
FIG. 3A is a plot of the voltage variation associated with the generation of the frequency of the scanning spectrum of the front radar transmission unit with the vehicle at rest.
Figure 3B:
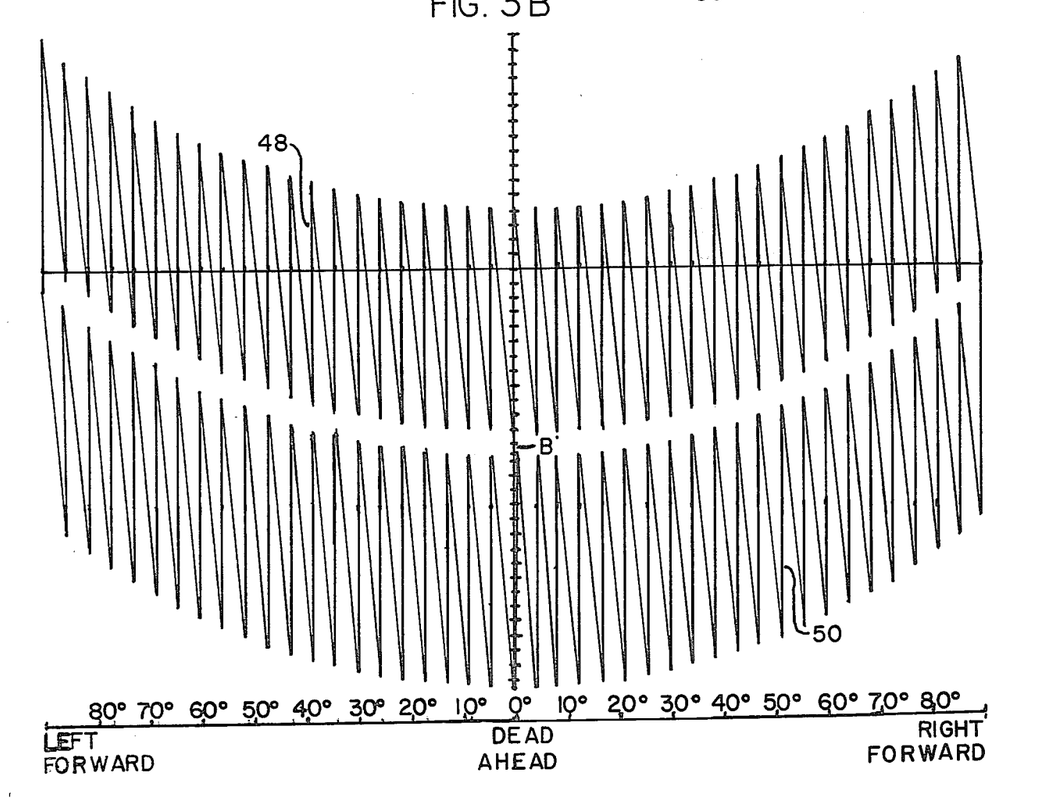
FIG. 3B is a similar plot of voltage cycles generated during each sweep of the front radar antenna at a given ground speed, indicating the variation of the scanning frequency spectrum occurring with varying headings of the front radar set antenna.

Referring to FIGS. 2, 3A and 3B, the nature of the transmitted rf pulses can be explained.

A radar-carrying craft indicated as an aircraft 44 carries the radar sets such that the 180° sweep covers 90° to the left and right of the direction of motion of the aircraft in fore and aft locations on the aircraft.

The doppler shift is ineffective for rates of closure of a predetermined minimum at the extreme ends of the antenna swings and also there is a minimum range of the radar which is indicated in areas 46 on the chart in FIG. 2.

The antenna sweeps through the various headings from dead ahead or 0° headings, to 90° left and right thereof, with the transmission of these scanned frequency spectrums directed at predetermined increments therebetween. Similarly, movement of the rear radar set occurs in synchronism, but transmitting at a single frequency.

Referring to FIG. 3A, there is depicted the upper and lower frequency spectrum bands which are scanned during the respective sweeps of the forward radar antenna. The upper band is indicated at 48 determining the received echo signals only from "passive" detected objects, whereas the lower spectrum band indicated generally at 50 is such as to produce return echos from "aggressive" detected objects.

The plots of FIG. 3A correspond to the voltage output of the sawtooth voltage generator 32 which in turn correspond to the frequency scanning spectrum.

The representation of FIG. 3A is the relationship between the upper and lower bands 48 and 50 with respect to the receiver band pass frequency which is indicated at "A" on the graph, i.e., the frequency shift spectrum of the upper band 48 begins at a frequency slightly above the receiver band pass frequency and scans upwardly in frequency from that point. Whereas, with the lower band 50, the scan is initiated at a frequency slightly below the receiver band pass frequency and is scanned to lower frequencies.

The relationship of the upper and lower bands 48 and 50 and the receiver band frequency depicted is at zero ground speed of the radar-carrying craft.

The vertical axis of the diagram represents a relative difference in frequency for the corresponding rate of motion which will shift the transmitted frequency such as to fall within the receiver band pass frequency. That is, at zero ground speed, the upper band 48 will be shifted downwardly as viewed in FIG. 3A or the returning echo will be of a lower frequency after reflecting from the moving object, which is receding from the radar-carrying craft 44.

Various rates of movement will be covered by the range of frequencies contained in the upper band 48. That is, for the lowermost region of each of the scans, relatively slight degrees of relative velocity will cause a relatively slight shift to the lower frequency of the receiver band pass frequency. Whereas, at the upper range thereof, relatively high degrees of relative velocities will cause the upper frequencies to be shifted back into the receiver band pass frequency. Thus, a full range represented by the axis will cover the full range of relative velocities.

In the lower band 50, the frequencies generated during these transmissions upon being reflected from an "aggressive" moving object, i.e., a moving object which has a heading having a component extending toward the radar-carrying craft, will cause a shift of the transmission pulses at a given frequency into the receiver band pass for the velocity range covered by the lower band 50.

FIG. 3B depicts the relative shape of the frequency scanning spectrum with the aircraft 44 moving at a given speed relative to the ground indicated at point "B" on the chart.

With the aircraft traveling at a given ground speed, the ground echo producing frequency will vary with the heading of the respective antennas. That is, at a 90° left or right heading, the movement of the aircraft relative to the ground will not produce a doppler shift of the reflected transmitted pulses. Whereas, at the dead ahead or dead astern heading of the antenna, the doppler shift induced by the ground speed of the aircraft will be at a maximum. This corresponds to the plot of FIG. 3B in which the band of ground echo frequencies is curved from the original spectrum at the far left and right to the maximum shift in frequency in the dead ahead position of the forward antenna 10.

According to the concept of the present invention, the lower and upper spectrum bands 48 and 50 are shifted in direct correspondence with the change in doppler frequencies as the antenna is swept and in direct proportion to the ground speed of the radar-carrying craft.

As per the diagrammatic representation of FIG. 3B, the upper or "passive" object detecting spectrum 48 is shifted by the degree of doppler shift occurring due to the ground echo while the lower or "aggressive" object detecting spectrum 50 is enhanced, i.e., the frequency is reduced with increasing ground speed and/or with the antenna heading.

Thus, the ground clutter echo frequency is avoided throughout a range of ground speed or headings of the forward antenna 10.

The primary factor of this scheme is the increased efficiency of the scanning process as can best be explained by an examination of FIG. 3B.

In the prior art systems as described above, scanning is carried out completely from the frequency corresponding to point "A", in turn corresponding to the maximum speed of the aircraft, for all ground speeds of the aircraft However, the greatest of the closure rates or relative velocities may only be encountered at maximum ground speed of the aircraft. That is, the maximum closure rate would only exist at the maximum rate of motion of the craft. This is so since, if the aircraft is capable of going 600 mph and will encounter other airplanes which are assumed to be capable of a maximum speed of 600 mph, the maximum closure rate would be 1200 mph, the additive rate. However, if the aircraft is only traveling 200 mph and can encounter aircraft going a maximum speed of 600 mph, the maximum closure rate will merely be 800 mph and scanning for aircraft at a relative velocity of 1200 mph is wasted energy and time.

By the concept according to the present invention, the shift of the scanning frequency bands with the ground speed of the vehicle, doppler shift detection scanning of a relatively narrow frequency spectrum is capable of detecting all of the possible rates of relative motion.

It will also be noted that the upper or passive object detecting band 48 and the lower or aggressive object detecting band 50 define an arrangement centered around the narrow width of frequencies corresponding to the ground echo, eliminating the problem associated therewith, and also enabling determination of the passive or aggressive attitude of the detected object in relation to the radar-carrying craft.

This latter determination is possible since, if an object is detected during the sweep of the antenna 10 in which the lower band 50 is transmitted, a return signal could only be reflected from an aggressive moving object in relation to the radar-carrying craft.

This latter capability can be understood since if the component of the relative velocity of a detected object in the direction of the antenna heading at the point of detection is below the corresponding component of the ground speed of the radar-carrying craft, the attitude of the detected object is necessarily aggressive, inasmuch as if the detected object is inclined toward the aircraft, this produces a closure rate of greater than the component ground speed of the radar-carrying craft in the direction of this heading.

Accordingly, if this rate of closure is less, this object necessarily has a passive relationship with respect to radar-carrying crafts.

This inherently is achieved by detection of an object during the sweep corresponding to the upper band 48. Similarly, if a velocity of a detected object is greater than the ground speed of the radar-carrying craft, as it must be if it is detected during a sweep corresponding to the transmission of the lower band 50, then it of necessity has an aggressive attitude. That is, its heading is such as to be inclined toward the radar-carrying craft and thus may be characterized as aggressive.

The categorization into passive and aggressive types of detected objects is of course of significance in that the evasive action to be taken will be much different when the radar-carrying craft is overtaking the detected object than when the detected object is moving toward the radar-carrying craft and also the urgency of evasive action would typically be much greater for avoiding objects with an aggressive attitude.

The plotting of several points of the motion of the detected objects will enable, as noted above, detection of the convergency of courses and the calculation of the probability of a collision and enable determination of a possible course of evasive action in emergency situations.

There are many possible methods of handling the incoming data, such as a large capacity computer processing of the information to evaluate the conditions necessary for sounding an alarm.

Many refinements to properly react to practical situations will of course be possible, such as to prevent reaction to temporary collision conditions due to aircraft undergoing a banking turn such that temporary collision courses could be indicated, but which will rapidly pass. This will prevent many unnecessary alarm conditions from being signalled, increasing the confidence in the alarm system by the pilot.

The most dangerous condition would be the situation whereat the echo return antenna position during an aggressive sweep is constant since this condition indicates a steadily and rapidly converging relationship between the courses of the radar-carrying craft and the detected object. That is, the aircraft are on a collision course rather than a temporarily converging course due to maneuvering or changing of headings, etc., of the respective crafts.

It will also be appreciated that the information from the rearward radar set can be utilized to generate other useful data such as cross winds, ground speed indication and the like. The radar sets could also be employed as a ground radar system with the aircraft on the runway and at rest in order to maximize the utility of the radar set employed in the system.

It is noted that in the description of this basic concept, no provision was made for detecting the relative elevation of the radar-carrying craft and the detected object.

Furthermore, the antenna sweeps are oriented with respect to the direction of motion of the aircraft. The airplane may of course encounter a significant cross wind which will render the course heading of the airplane somewhat different from the fore and aft attitude of the aircraft. In a heavy cross wind, an axis centered sweep of the antennas could complicate operation of the system.

Furthermore, it is also apparent that the rear radar could be employed in the collision detection situation for aircraft approaching from the rear as well as certain other functions of navigation.

This system, while having particular applicability to aircraft, in simpler form may also be employed for other situations as aboard ships at sea.

The above-recited objects of the present invention are achieved in this system in that the vehicle borne radar greatly simplifies the data and calculations which must be handled, since only a relatively simple collision determination is made with respect to the individual craft, which is well within the capacity of the current small computers or state of the art hardwired circuitry.

This system is also highly efficient due to the matching of the spectrum of scan in correspondence with the ground speed of the craft and further inherently precludes return of a ground echo signal at the receiver frequency as distinguished from the prior art system.

The embodiments of the invention in which an exclusive property or privilege is claimed are defined as follows:

1. A craft borne radar system for determination of relative velocity between said craft and relatively moving objects to be detected, said system comprising:
   a radar antenna means mounted to said craft;
   radar transmitter means causing a sequence of beamed pulses of radio frequency to be transmitted from said radar antenna means, each of said pulses in sequence being of a differing frequency, varying over a scanning frequency spectrum;
   receiver means tuned to a narrow frequency band width related to said scanning frequency spectrum such as to correspond to a Doppler shifting of said transmitted frequencies reflected from a detected object moving at a relative velocity such as to shift one or more of said pulse transmission frequencies into said receiver means frequency band width; and said radar transmitter means causing transmission of a pair of scanning frequency spectrum bands from said antenna means, said bands together constituting said scanning frequency spectrum, each band consisting of sequential pulses each of a frequency varying through a range of frequencies; said bands being separated by a narrow range of frequencies corresponding to a ground echo signal of a frequency in said receiver means frequency band which would otherwise be reflected from the ground at said receiver means frequency band if transmitted from said radar transmitter means at said narrow band of frequencies for a given groundspeed of said craft;

means for detecting said ground echo signal frequency of said craft as said craft moves at varing groundspeeds;

means for shifting said scanning frequency spectrum of said radar transmitter means in correspondence with the groundspeed of said craft to thereby shift said narrow band of frequencies separating said scanning frequence spectrum bands with varying groundspeed of said radar-carrying craft.

2. The radar system according to claim 1 wherein said radar antenna means comprises a forward facing antenna and includes means for sweeping said radar antenna cyclically along directions generally forward of said craft and wherein said means for detecting said ground echo frequency of said craft includes means for detecting said ground echo frequency with changing antenna heading and wherein said means for shifting said scanning frequency spectrum shifts said narrow band separating said scanning frequency spectrum bands in accordance with the changing ground echo frequency, with changing antenna headings.

3. The radar system according to claim 2 wherein said means for detecting said ground echo frequency comprises a rear radar set means including a rear antenna mounted to said craft and further including means for oscillating said rear antenna in a corresponding sweep to said forward facing antenna in synchronism therewith, and further including a rear radar set transmitter means transmitting radio frequency pulses from said rear radar set antenna; and means for detecting the Doppler shift of said transmitted rear radar radio wave high frequency pulses from ground echo signals of said rear radar set transmitter means.

4. A method of detecting a relative velocity between a radar-carrying craft and a detected object, the method comprising the steps of:

transmitting high frequency radio wave signals from a swinging radar antenna carried by said craft each in the form of a sequence of pulses, each successive pulse in said sequence varying through a range of frequencies defining a scanning frequency spectrum;

detecting return echo signals from said transmissions with a narrow band pass to a frequency corresponding to return signal echos from transmitted pulses which are shifted in frequency in correspondence with a range of relative velocities between said radar-carrying craft and said detected object; and shifting said scanning frequency spectrum to decrease the frequencies of each of the pulses in said sequence in accordance with the detected groundspeed and swing of the antenna of said radar-carrying craft such as to increase the maximum rate of relative velocity of detected objects detectable by said range of frequencies in said scanning frequency spectrum with increasing groundspeed thereof and more direct headings therebetween;

whereby higher rates of relative velocity of detected objects may be detected at higher groundspeeds of said radar-carrying craft and more direct headings between said craft and said detected object.

5. The method according to claim 4 wherein said step of transmitting high frequency radio waves from a radar antenna carried by said craft in the form of a sequence of pulses of varying frequencies in scanning frequency spectrum includes the step of transmitting two separate scanning frequency spectrum bands with an intervening frequency band corresponding to a ground echo frequency to which said receiver means is tuned.

6. The method according to claim 5 wherein said step of transmitting two separate scanning frequency spectrum bands includes the step of transmitting said scanning frequency spectrum bands at higher and lower frequencies respectively than said receiver frequency at zero groundspeed of said craft and wherein said step of shifting said scanning frequency spectrum includes the step of, with increasing groundspeeds of said craft, shifting said intervening frequency band in correspondence with the corresponding shift of said scanning frequency spectrum of said transmitted radar pulses, and also includes the step of shifting both of said scanning spectrum frequency bands to be of a lower frequency range in direct correspondence with the ground echo frequency.

* * * * *

UNITED STATES PATENT AND TRADEMARK OFFICE
CERTIFICATE OF CORRECTION

PATENT NO. : 4,403,220
DATED : 9/6/83
INVENTOR(S) : John S. Donovan

It is certified that error appears in the above-identified patent and that said Letters Patent are hereby corrected as shown below:

Column 3, line 51, delete "ground clutter".

Column 3, line 52, delete "whiich" and insert --which--.

Signed and Sealed this

Twenty-second Day of May 1984

[SEAL]

Attest:

GERALD J. MOSSINGHOFF

Attesting Officer     Commissioner of Patents and Trademarks